US009768459B2

(12) United States Patent
Thampan et al.

(10) Patent No.: US 9,768,459 B2
(45) Date of Patent: Sep. 19, 2017

(54) HYDROGEN FUEL CELL CARTRIDGE, HYDROGEN FUEL CELL SYSTEM, AND NON-TRANSITORY COMPUTER-READABLE STORAGE MEDIUM FOR CONTROLLING HYDROGEN FUEL CELL CARTRIDGE

(71) Applicant: The United States of America, as represented by the Secretary of the Army, Washington, DC (US)

(72) Inventors: Tony M. Thampan, Bear, DE (US); Jonathan Novoa, North East, MD (US); Terrill B. Atwater, Bel Air, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 392 days.

(21) Appl. No.: 14/451,988

(22) Filed: Aug. 5, 2014

(65) Prior Publication Data
US 2016/0043419 A1    Feb. 11, 2016

(51) Int. Cl.
*H01M 8/04* (2016.01)
*H01M 8/0606* (2016.01)
*H01M 8/065* (2016.01)
*H01M 8/04082* (2016.01)

(52) U.S. Cl.
CPC ..... *H01M 8/0606* (2013.01); *H01M 8/04208* (2013.01); *H01M 8/04216* (2013.01); *H01M 8/065* (2013.01)

(58) Field of Classification Search
CPC ....................................................... H01M 8/04
See application file for complete search history.

(56) References Cited

U.S. PATENT DOCUMENTS

2013/0196243 A1\* 8/2013 Braithwaite ...... H01M 8/04067
                                                                        429/440
2014/0044605 A1    2/2014 Langan et al.

OTHER PUBLICATIONS

Grew et al., "Assessment of Alane as a Hydrogen Storage Media for Portable Fuel Cell Power Sources," Journal of Power Sources, vol. 217, pp. 417-430 (Nov. 2012).

\* cited by examiner

*Primary Examiner* — Jacob Marks
(74) *Attorney, Agent, or Firm* — Azza Jayaprakash

(57) ABSTRACT

A hydrogen fuel cell cartridge is provided. Furthermore, a non-transitory computer-readable storage medium is provided, which is configured to store a program for controlling a hydrogen fuel cell cartridge of a fuel cell. In addition, a hydrogen fuel cell system is provided, which includes a plurality of cartridge segments and a control unit.

20 Claims, 7 Drawing Sheets

HYDROGEN FUEL CELL CARTRIDGE, HYDROGEN FUEL CELL SYSTEM, AND NON-TRANSITORY COMPUTER-READABLE STORAGE MEDIUM FOR CONTROLLING HYDROGEN FUEL CELL CARTRIDGE

GOVERNMENT INTEREST

The invention described herein may be manufactured, used, imported, sold, and licensed by or for the Government of the United States of America without the payment of any royalty thereon or therefor.

FIELD OF THE INVENTION

The present disclosure relates generally to the field of fuel cells and, more particularly, to hydrogen fuel cell systems.

BACKGROUND OF THE INVENTION

The use of fuel cell technology for portable power systems potentially offers a lower weight burden compared to other portable power sources. However, high power density, low temperature Polymer Electrolyte Membrane Fuel Cells (PEMFCs) require a $H_2$ fuel source. One promising $H_2$ fuel source is alane ($AlH_3$). This chemical hydride offers high $H_2$ gravimetric density, as well as a $H_2$ feed stream with only trace amounts of contaminants.

The process of $H_2$ production from alane ($AlH_3$) is:

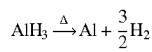

The only products from the above reaction are $H_2$ and aluminum. However, conventional PEMFECs using this method of $H_2$ production from alane have a number of drawbacks. For example, after prolonged heating of alane at low temperatures, increasing the temperature does not produce additional $H_2$ gas. Furthermore, conventional PEMFCs, which heat the alane at higher temperatures, consume more energy heating the alane (or hydrogen fuel source), making less energy available for the user. In addition, due to the larger thermal mass of conventional PEMFCs, a significant amount of $H_2$ gas is released during shut down as the cartridge cools down, requiring the ability to utilize and store the energy contained in the $H_2$ gas. Lastly, the process of replacing used fuel cell cartridges during operation of the PEMFC (called "hot swapping") requires users to handle a hot fuel cell cartridge, which is a safety hazard.

SUMMARY OF THE INVENTION

The present disclosure resolves all of the aforementioned problems associated with conventional PEMFCs. According to an exemplary embodiment of the present disclosure, a hydrogen fuel cell cartridge is provided that includes a plurality of cartridge segments. Each of the plurality of cartridge segments includes at least one insulation layer, at least one heater layer, at least one fuel source layer comprising a hydrogen fuel source compound; and at least one waste heat exchange layer. The at least one fuel source layer is adjacent to the heater layer and the waste heat exchange layer, and the at least one waste heat exchange layer contains a coolant fluid.

In one embodiment, a non-transitory computer-readable storage medium configured to store a program for controlling a hydrogen fuel cell cartridge of a fuel cell, the program includes instructions for selecting a cartridge segment of the hydrogen fuel cell cartridge with the hydrogen fuel source that has not been depleted, determining a required hydrogen demand of the hydrogen fuel cell cartridge, controlling a heater layer of the selected cartridge segment, measuring hydrogen production of the selected cartridge segment, and determining whether the required hydrogen demand has been met.

Another embodiment of the present disclosure is a hydrogen fuel cell system including a plurality of cartridge segments and a control unit. Each of the plurality of cartridge segments includes at least one insulation layer, at least one heater layer, at least one waste heat layer, and at least one fuel source layer. The control unit is configured to select a cartridge segment of the hydrogen fuel cell cartridge with the hydrogen fuel source that has not been depleted, determine a required hydrogen demand of the hydrogen fuel cell cartridge, control a heater layer of the selected cartridge segment, measure hydrogen production of the selected cartridge segment, and determine whether the required hydrogen demand has been met.

BRIEF DESCRIPTION OF THE DRAWINGS

The accompanying drawings, which are included to provide further understanding of the present disclosure, and are incorporated in and constitute a part of the specification, illustrate preferred embodiments of the present disclosure, and together with the description serve to explain the principles of the present disclosure. The present disclosure will now be described further with reference to the accompanying drawings as follows.

DETAILED DESCRIPTION

Figure 1:
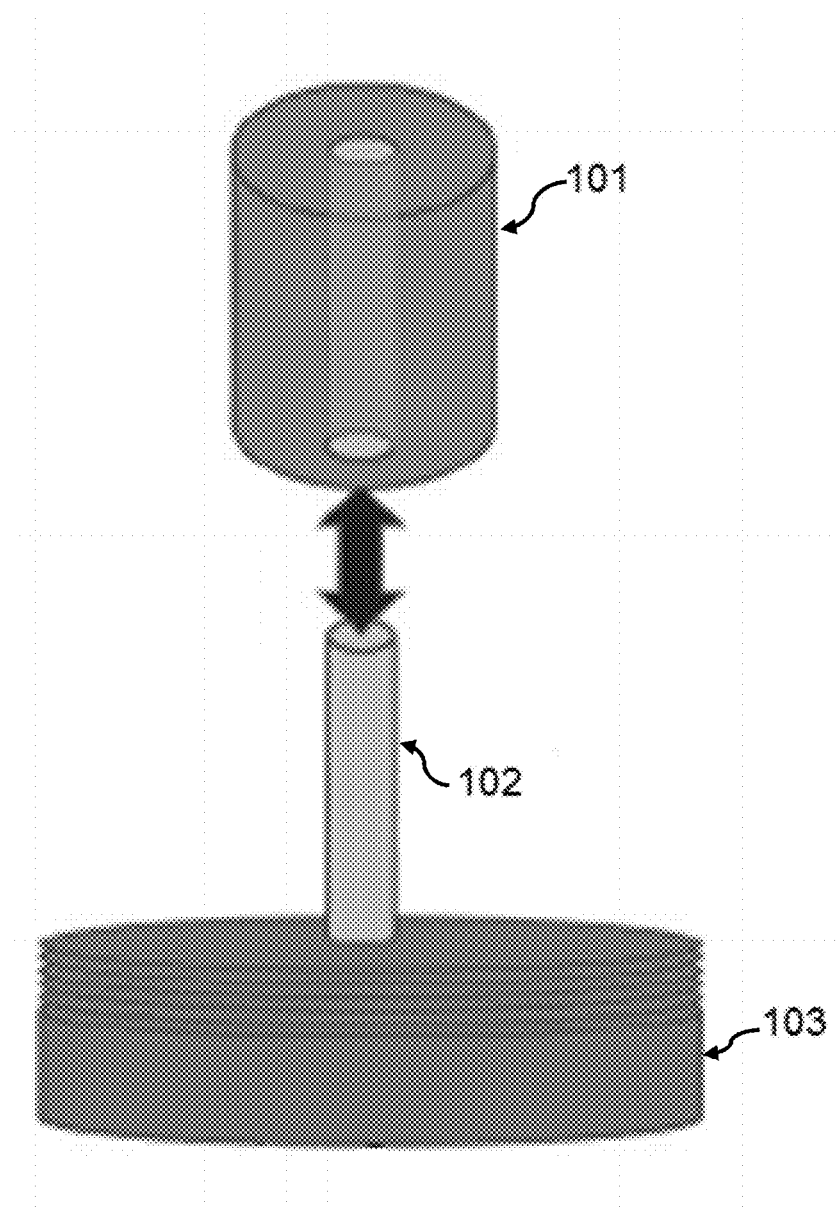
FIG. 1 is a diagram illustrating a detail of a conventional PEMFC cartridge.

FIG. 1 depicts a conventional alane PEMFC cartridge, which consists of a single alane fuel pellet 101 with a cavity, in which a single cartridge heater 102 is placed. The alane fuel pellet 101 and cartridge heat 102 are secured in a pressure vessel (not shown in FIG. 1) with a pressure vessel cap 103. As discussed, $H_2$ gas is produced from alane, in accordance with the following reaction:

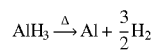

The rate of $H_2$ desorption from alane is strongly dependent on temperature; the reaction rate constant for this reaction (k) can be represented as $k=Ae^{(-Ea/RT)}$, where A, $E_a$, and R are the pre-exponential factor, activation energy, and universal gas constant (respectively). This endothermic reaction is thermodynamically feasible at room temperature, but requires higher temperatures to produce $H_2$ at an effective rate for a conventional PEMFC. Thus, in the conventional PEMFC in FIG. 1, cartridge heater 102 applies heat to alane pellet 101 (ranging from 155° C. to 185° C.), resulting in the production of $H_2$ gas.

Figure 2:
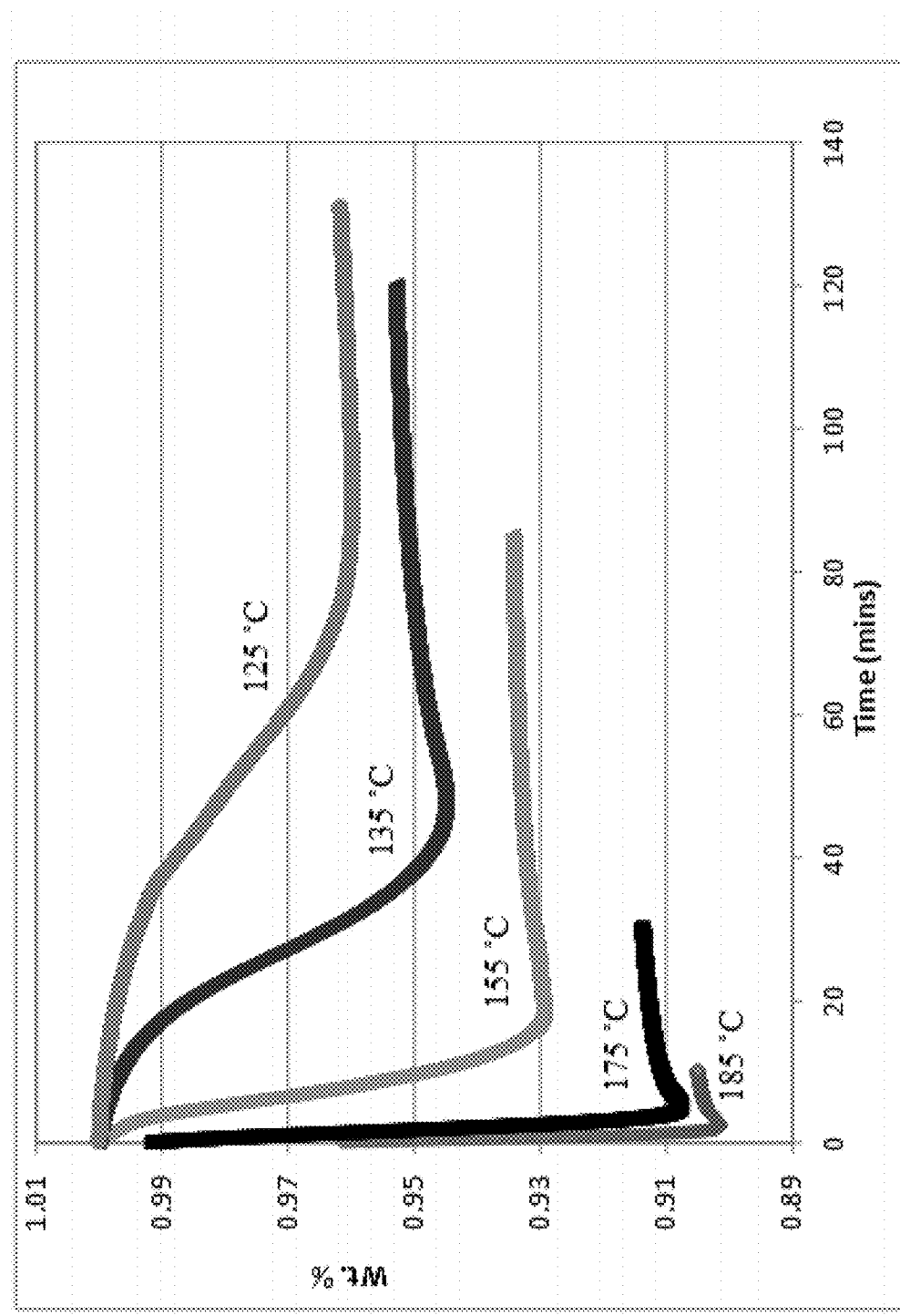
FIG. 2 is a graph illustrating the effect of temperature on the amount of $H_2$ released by $AlH_3$.

In conventional PEMFCs, a significant challenge for effective fuel utilization of the cartridge is maximizing production of $H_2$ gas from the alane fuel source and satisfying the specific fuel demands of the user. As shown in FIG. 2, alane must be heated to temperatures ranging from 155° C., in order to maximize the percentage weight of $H_2$ released from the alane fuel source. Lower temperature results in significantly less $H_2$ release.

Conventional chemical hydride systems increase the temperature of the entire alane fuel source (such as alane fuel pellet 101 in FIG. 1), as more $H_2$ is required by the user. However, this approach requires more energy from the PEMFC to heat the entire alane fuel source. Furthermore heating the entire alane fuel source can result in the production of excess $H_2$, which requires the ability to store unused $H_2$ gas or utilize the excess $H_2$ gas. Moreover, the removal of depleted cartridges, which were heated at such high temperatures, requires users to handle hot cartridges, which is a safety hazard.

Figure 3:
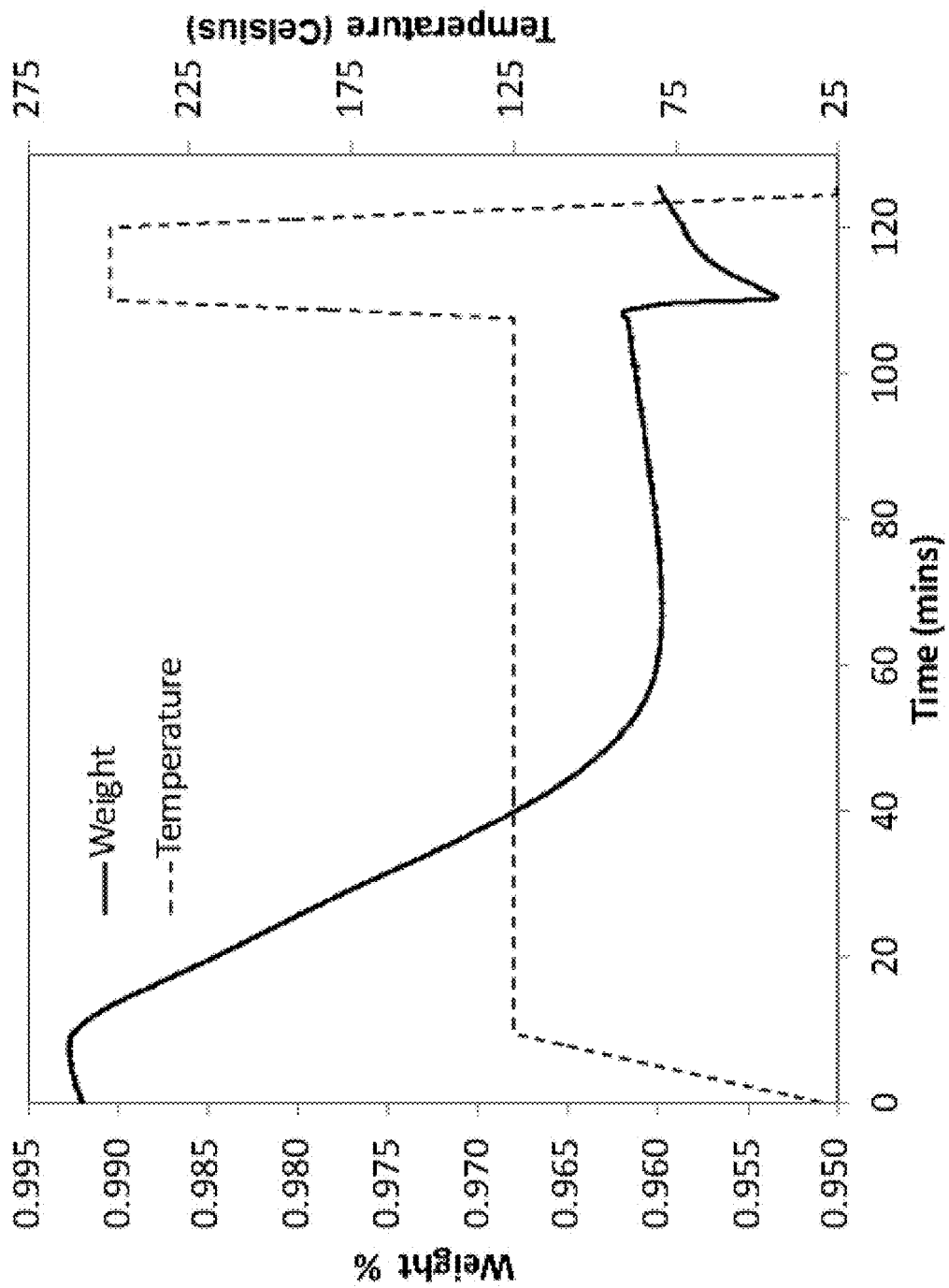
FIG. 3 is a graph illustrating the effect of high temperatures on the amount of $H_2$ released after applying low temperatures to $AlH_3$.

In addition, heating the entire alane fuel source may result in sections of the cartridge being at lower temperatures, ranging from 90° C. to 155° C., which has drawbacks. As shown in FIG. 3, if the alane fuel source is heated at lower temperatures (ranging from 90° C. to 155° C.), all of the $H_2$ gas will not be released from the alane fuel source even if the alane fuel source is later heated at higher temperatures. Thus, heating the alane fuel source in a PEMFC at lower temperatures reduces the energy density of the PEMFC.

Figure 4:
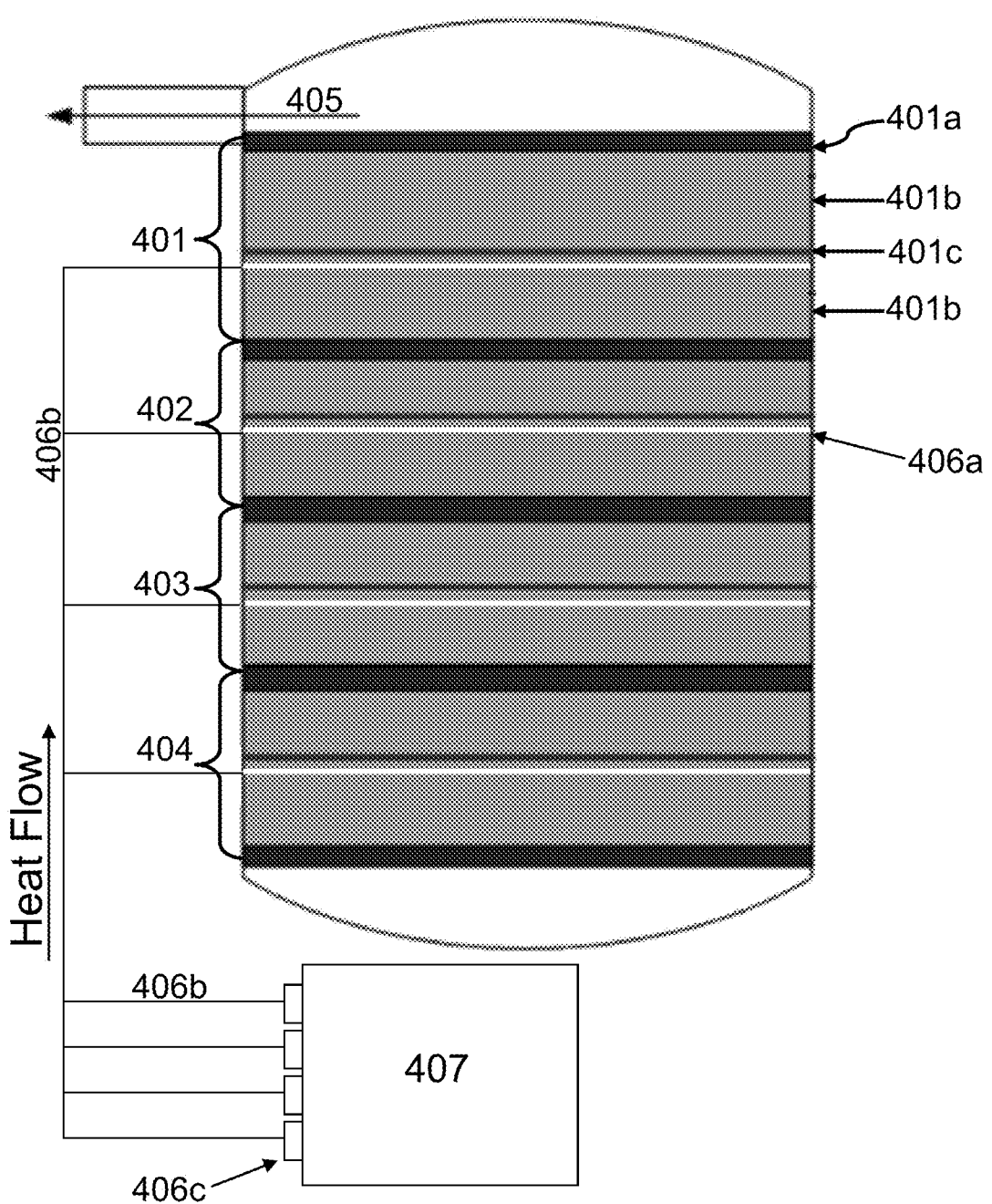
FIG. 4 is a diagram of an exemplary PEMFC cartridge according to the present disclosure.

The present disclosure resolves the aforementioned disadvantages of the conventional art. More specifically, the present disclosure presents a novel cartridge design that facilitates heating of an individual segment of an alane fuel source in a PEMFC to a desired temperature without significantly increasing the temperature of adjacent segments of alane fuel source in the PEMFC. In an exemplary embodiment (shown in FIG. 4) of the present disclosure, the PEMFC cartridge includes a first cartridge segment 401, a second cartridge segment 402, a third cartridge segment 403, and a fourth cartridge segment 404. Each cartridge segment includes at least one fuel source layer (e.g., fuel source layers 401b). Furthermore, each fuel source layer is adjacent to at least one heater layer (e.g., heater layer 401c). In addition, each fuel source layer is positioned between at least two insulation layers (e.g., insulation layers 401a), as shown in FIG. 4. All of the aforementioned layers are porous, and $H_2$ desorbed from the fuel source layers travels through all of the layers of the PEMFC cartridge and is exhausted from exhaust 405. This $H_2$ is then delivered to the fuel cell stack 407.

In another aspect of the present disclosure, each fuel cartridge segment is augmented by at least one waste heat exchange layer 406. In this exemplary embodiment, waste heat that is produced from the high-temperature PEMFC is transferred to one or a plurality of waste heat exchange layers, which are adjacent or proximate to a fuel source layer. The waste heat exchange layer may be used to increase or decrease the temperature of the fuel source layer. The waste heat exchange layer includes one or a plurality of heat pipes with a coolant that has a vaporization point above 180° C. Suitable coolants include (but are not limited to) glycols (such as propylene glycol and ethylene glycol), and oils (such as mineral oil and silicon oil). The waste heat exchange layer is coupled to a heat pump that varies the flow rate of the coolant fluid. As shown in the exemplary embodiment in FIG. 4, the waste heat exchange layer may include a condenser section 406a, a micro heat pipe section 406b, and an evaporator section 406c.

In an exemplary embodiment of the present disclosure, the fuel source layers are comprised of an $H_2$ fuel source. Suitable $H_2$ fuel sources also include (but are not limited to) $AlH_3$ (alane), ammonia borane, and ethylene diaminoborane (EDAB), lithium hydride, or lithium aluminum hydride. Different polymorphs of alane may be utilized in the present disclosure, although alpha alane is the most stable form of alane. Suitable heater layers are resistive film heaters, including (but not limited to) polyimide heaters, silicone rubber heaters, mica heaters, metal heaters, and ceramic heaters. Suitable polyimide heaters are comprised of polymer materials, including (but not limited to) polyimides, polyamide-imides, polyetheretherketones, polyphenylenesulfides, polybenzimidazoles, wholly-aromatic polyesters, and fluoropolymers.

The insulation layers are comprised of conventional insulation materials. In an exemplary embodiment of the present disclosure, the insulation materials have a thermal conductivity that ranges from 0.003 W/m/K to 0.04 W/m/K, in order to avoid significant thermal leakage between the cartridge segments. Suitable materials for the insulation layer include (but are not limited to) aerogels, pyrogels, perlite, air, vacuum, and mineral wool.

According to exemplary embodiments of the present disclosure, the dimensions of the insulation layers, fuel source layers, and heater layers are as follows. The thickness of each insulation layer ranges from 0.01 cm to 1 cm, 0.05 cm to 0.5 cm and 0.09 cm to 0.11 cm. The radius of each insulation layer ranges from 0.1 cm to 12.7 cm, 0.6 cm to 6.35 cm and 0.8 cm to 1.8 cm The volume of each insulation layer ranges from 0.05 $cm^3$ to 507 $cm^3$, 0.1 $cm^3$ to 63.3 $cm^3$ and 0.3 cm to 0.7 cm. The weight of each insulation layer ranges from 0.005 g to 76 g, 0.01 g to 9.5 g, or 0.03 g to 0.12 g.

The thickness of the fuel source layer ranges from 0.1 cm to 30 cm, 1 cm to 15 cm, or 2 cm to 4 cm. The total radius of the fuel source layer ranges from 0.01 cm to 13 cm, 0.1 cm to 6 cm, or 0.1 cm to 1.9 cm. The total volume of the fuel source layer ranges from 1 $cm^3$ to 15201 $cm^3$, 5 $cm^3$ to 1900 $cm^3$, or 10 $cm^3$ to 20 $cm^3$. The weight of the fuel source layers ranges from 2 g to 22,000 g, 10 g to 2,824 g, or 15 g to 31 g.

The thickness of each heater layer ranges from 0.001 cm to 0.2 cm, 0.01 cm to 0.1 cm, or 0.01 cm to 0.03 cm. The radius of each heater layer ranges from 0.1 cm to 12.7 cm, 0.5 cm to 6.35 cm, or 0.9 cm to 1.64 cm. The volume of each heater layer ranges from 0.01 $cm^3$ to 101 $cm^3$, 0.05 $cm^3$ to 13 $cm^3$, or 0.06 $cm^3$ to 0.14 $cm^3$. The weight of each heater layer ranges from 0.001 g to 5.1 g, 0.002 g to 0.63 g, or 0.015 g to 0.005 g.

In an exemplary embodiment of the present disclosure, heater layer 401c of first cartridge segment 401 heats fuel source layers 401b at heating temperatures, until all of the $H_2$ from the fuel source layers 401b is desorbed. Heating temperatures range from 100° C. to 210° C., from 155° C. to 200° C., or from 175° C. to 185° C. Insulation layers (e.g., insulation layers 401a) surrounding the fuel source layers allow only specific fuel source layers to be heated to heating temperature ranging from 155° C., without significantly impacting the temperature of the other cartridge segments. When and if the PEMFC requires additional $H_2$ (after all of the $H_2$ from first cartridge segment is desorbed), then the PEMFC cartridge heats alane fuel source layers from another cartridge segment (such as second cartridge second 402).

Figure 5:
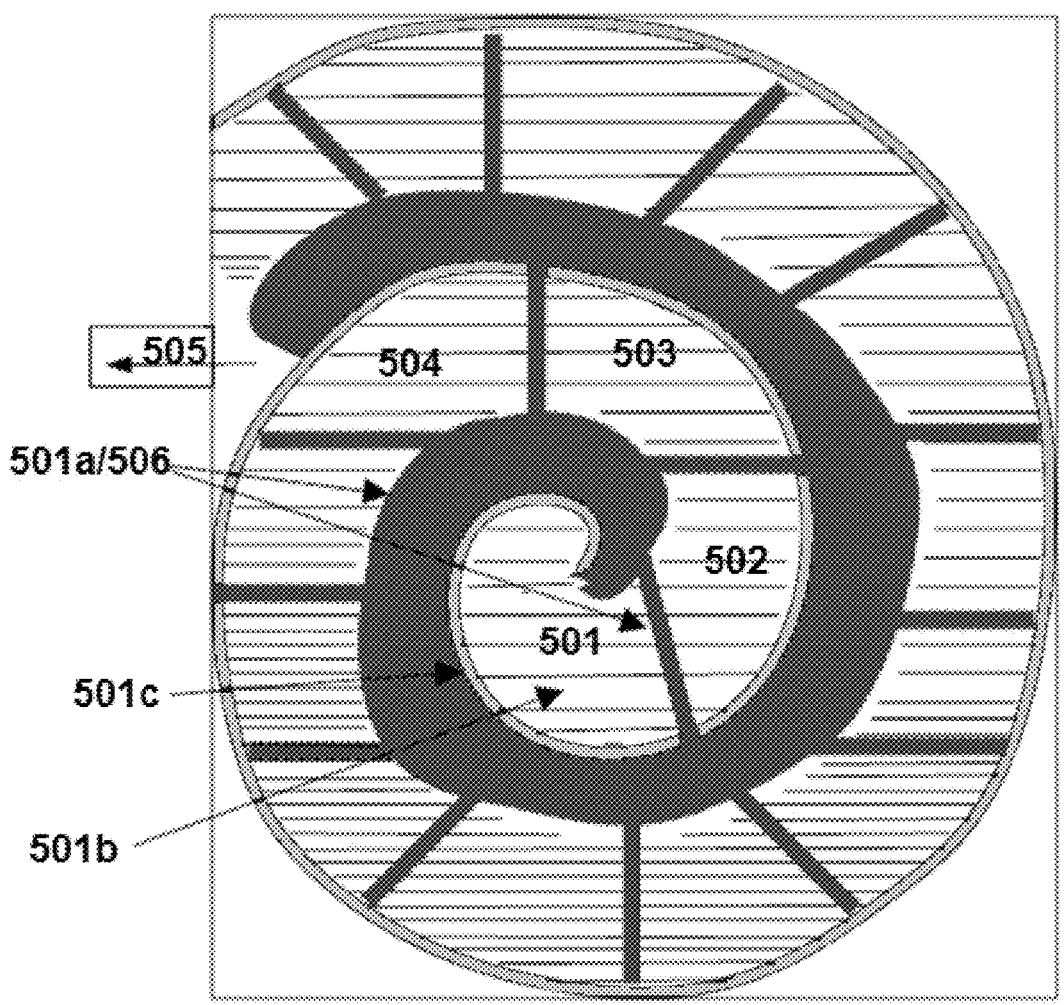
FIG. 5 is a diagram of another exemplary PEMFC cartridge according to the present disclosure.

An exemplary method for manufacturing the present PEMFC (shown in FIG. 4) includes forming a plurality of cartridge segments in the PEMFC cartridge. Each cartridge segment is formed by forming at least one insulation layer; forming at least one heater layer; forming at least one fuel source layer comprising a hydrogen fuel source compound; and forming at least one waste heat exchange layer. The at least one fuel source layer is adjacent or proximate to the heater layer and the waste heat exchange layer. The insulation layer may be created by the placing insulation material (e.g. aerogel) in the cartridge as a precut sheet or as filled in with insulation particles to the desired thickness. Compaction of the layer with a mechanical press may also be done to modify thickness and thermal conductivity of the insulation layer. The heater may be manufactured utilizing commercially available polyimide insulated foil heaters. The heaters are available in custom sizes and may be placed in the cartridge as shown in FIG. 4 or FIG. 5. As shown in FIG. 4, the waste heat exchange layer 406 may be manufactured by utilizing micro heat pipes transferring waste heat from the fuel cell stack to the fuel cell cartridge. The heat pipes may be constructed from titanium, aluminum or copper and the appropriate tube diameter with a valve system that may be selected to adjust the flow rate of the fluid including the amount of heat transfer. The heat is transferred from the fuel cell stack to the fuel cell cartridge utilizing a coolant fluid that is vaporized in the evaporator section 406c in the fuel cell stack 407. The vapor moves through the micro heat pipes section 406b to the fuel cell cartridge where the fluid condenses in the condenser section 406a located in the fuel cell cartridge. The condensation releases heat to the fuel cell cartridge for the desorption of $H_2$.

According to one aspect of the present disclosure, the fuel source layer may be created by compacting a fuel source (such as alane powder) utilizing a hydraulic press. According to another embodiment, a mold or binding material can also be utilized to produce a fuel source layer that can placed in each cartridge segment, as well as other conventional methods of forming alane pellets.

The present PEMFC cartridge may be easily integrated into conventional fuel cell units to provide power. Techniques of cartridge mechanical integration are well known in the art, including conventional methods of connecting and sealing gas delivery systems (such as propane, $CO_2$, and air portable gas canister delivery systems).

Another exemplary embodiment of the present disclosure is shown in FIG. 5. Similar to the PEMFC shown in FIG. 4, FIG. 5 shows a first cartridge segment 501, a second cartridge segment 502, a third cartridge segment 503, a fourth cartridge segment 504, and so on. Similar to FIG. 4, the PEMFC in FIG. 5 includes an insulation layer 501a (and/or a waste heat exchange layer 506), a fuel source layer 501b, and a heater layer 501c, as well as an exhaust 505. Similarly, the materials for the fuel source layer, heater layer, insulation layer, and waste heat exchange layer, which are discussed above, may be used in this embodiment.

The cartridge shown in FIG. 5 is manufactured by combining a fuel source layer, heater layer, and insulation layer; rolling the combined layers into a spiral; and placing the spiral in an insulated container (which includes an exhaust port) to form a PEMFC cartridge. The cartridge can be constructed from aluminum to provide mechanical strength. According to one exemplary embodiment, a waste heat exchange layer (condenser section of micro heat pipes) may also be combined with the fuel source layer, heater layer, and insulation layer. According to one embodiment, the fuel source layer, heater layer, insulation layer are combined using a calender; however, other conventional methods of compressing or combining layers may be used, including (but not limited to) dip coating or spray coating a slurry of the fuel source layer onto the heater layer, laminated to the insulation layer. Gaps are allowed in the layer of alane (or fuel source layer) to allow for placement of the insulation or waste heat material.

After forming a spiral with the combined layers, segments of insulation material or waste heat exchange layer material are inserted within the fuel source layer to form individual cartridge segments (as shown in FIG. 5). Similar to the insulation layer in the spiral, suitable materials for the segments of insulation material are conventional insulation materials having a thermal conductivity that ranges from 0.003 W/m/K to 0.04 W/m/K, in order to avoid significant thermal leakage between the cartridge segments. Suitable materials for the insulation layer include (but are not limited to) aerogels, pyrogels, perlite and mineral wool.

The spiral configuration shown in FIG. 5 allows the present PEMFC cartridge to be made in a thinner form, in comparison to the PEMFC cartridge configuration shown in FIG. 4. The dimensions of the cartridge and cartridge segments (described above) for the non-spiral cartridge embodiment may be used for the spiral cartridge embodiment.

Figure 6:
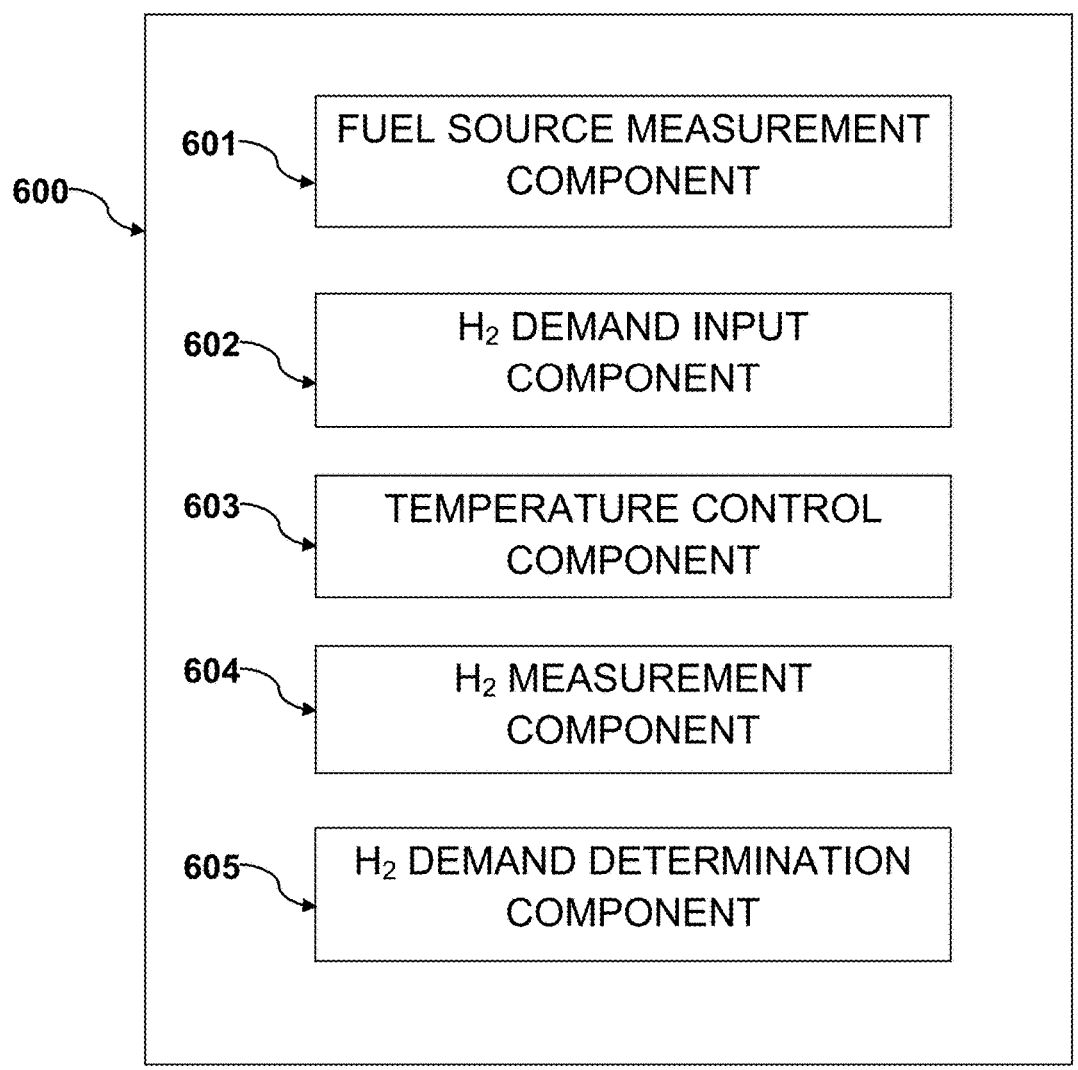
FIG. 6 is a diagram of an exemplary control unit for an exemplary PEMFC according to the present disclosure.
Figure 7:
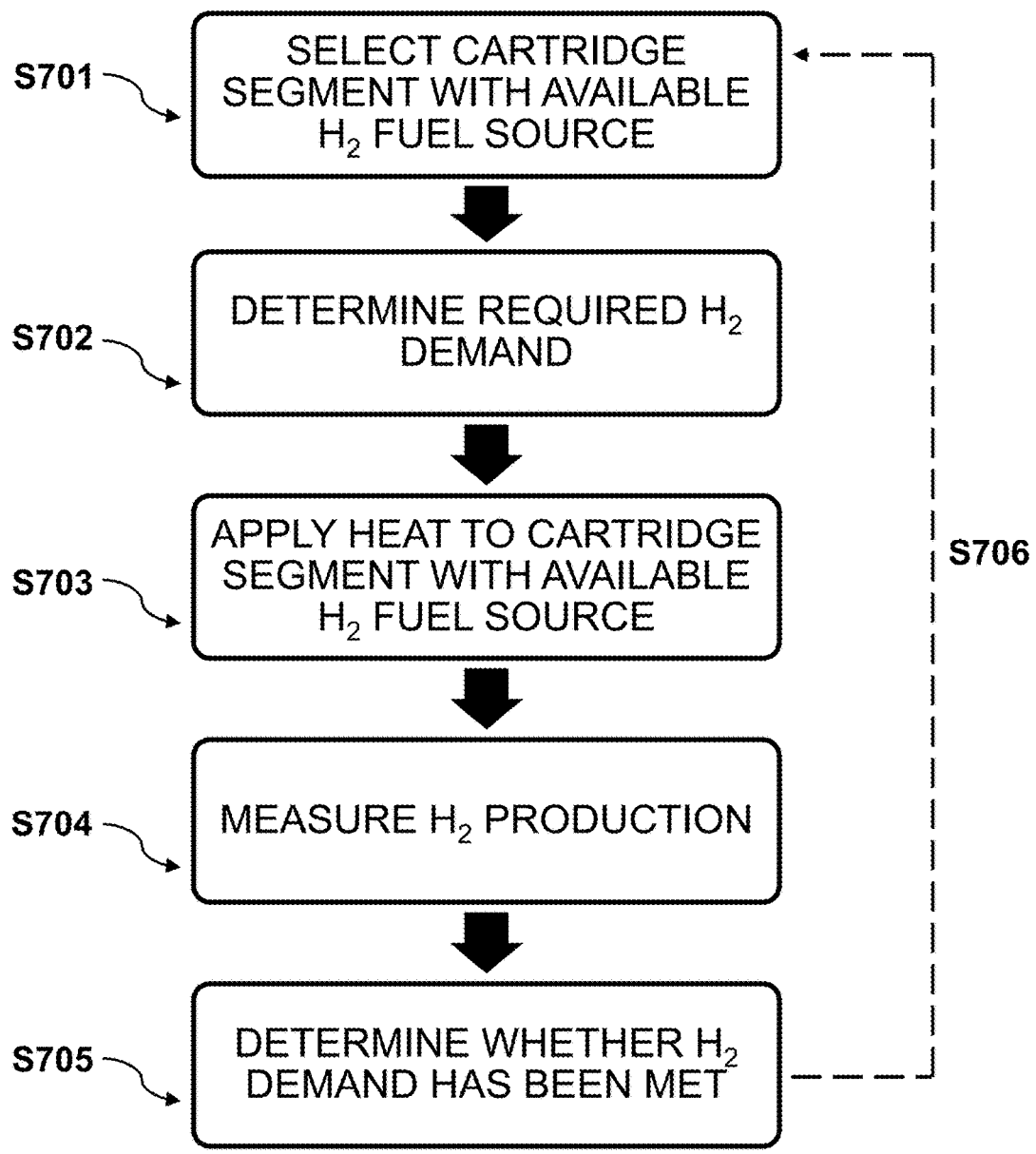
FIG. 7 is a diagram of an exemplary control method for an exemplary PEMFC according to the present disclosure.

FIGS. 6 and 7 show an exemplary control unit and control method (according to the present disclosure) for controlling heating of individual cartridge segments of the present PEMFC cartridge, respectively. The control unit and control method of present disclosure facilitate effective and efficient $H_2$ gas production and delivery to the PEMFC for power production. FIG. 6 depicts control unit 600, which includes fuel source management component 601, $H_2$ demand input component 602, temperature control component 603, $H_2$ measurement component 604, and $H_2$ demand determination component 605. As shown in FIG. 7, fuel source management component 601 determines which cartridge segments have been depleted and selects a cartridge segment that has not been completely depleted (Step S701). In Step S702, $H_2$ demand input component 602 determines the PEMFC load, determines the required $H_2$ demand (based on the PEMFC load), and sets the required $H_2$ flow rate (based on the $H_2$ demand). In Step S703, temperature control component 603 controls the heater layer by signaling a heater layer to apply heat to the cartridge segment with available $H_2$ fuel source, which was identified in Step S701. According to one aspect, temperature control component 603 controls the applied temperature, based on the required $H_2$ flow rate (set by $H_2$ demand input component 602). In Step S704, $H_2$ measurement component 604 measure $H_2$ production, based on input from a pressure sensor in the PEMFC (which measures $H_2$ pressure). If $H_2$ measurement component 604 determines that $H_2$ is no longer being produced (or, alternatively, $H_2$ is not being produced at the required $H_2$ flow rate), then fuel source management component 601 identifies the cartridge segment (in use) as depleted and $H_2$ demand determination component 605 determines whether the PEMFC $H_2$ demand has been met (in Step S705). If the $H_2$ demand has been met, control unit 600 signals the PEMFC to shut down. If $H_2$ demand has not been met, during Step S706, control unit 600 signals fuel source management 601 to select the next cartridge segment that has not be completely depleted (in Step S701), and method in FIG. 7 continues again (unless all of cartridge segments have been depleted). If all of the cartridge segments have been depleted, fuel source management component 601 signals the control unit 600, which signals the PEMFC to shut down.

In yet another aspect of the present disclosure, control unit 600 controls the waste heat produced by the PEMFC, depending on the load required by the PEMFC. Depending upon the load, control unit 600 will directly vary the wattage of the PEMFC, which will produce more or less waste heat from the PEMFC. For example, at lower loads, control unit 600 will operate the PEMFC at a lower wattage, which will produce less waste heat from the PEMFC. At higher loads, control unit 600 will operate the PEMFC at a higher wattage, which will produce more waste heat from the PEMFC. By controlling the waste heat, control unit 600 controls the amount of waste heat that is transferred to the waste heat exchange layer and, in turn, the temperature of the fuel source layer.

In another aspect of the present disclosure, control unit 600 controls the flow rate of the coolant fluid in the waste heat exchange layer, depending upon the power demand for the PEMFC. Thus, at higher power demands for the PEMFC, control unit 600 will increase the flow rate of the coolant fluid, which will increase the waste heat applied to the fuel source layer, producing more $H_2$ gas. At lower power demands, control unit 600 will decrease the flow rate of the coolant fluid, which will decrease the waste heat applied to the fuel source layer, producing less $H_2$ gas. In another exemplary embodiment of the present disclosure, control unit 600 is coupled to a temperature sensor. If the temperature sensor senses or predicts temperatures ranging from 90° C. to 155° C. in an unused cartridge segment, control unit 600 will decrease the heat applied to the cartridge segment by decreasing the heat applied to fuel source layer by the heater layer and/or increasing the flow rate of the coolant fluid in the waste heat exchange layer. The temperature sensor may be implemented as an actual temperature sensor or a virtual temperature sensor. The virtual temperature sensor predicts or estimates temperatures, based on various operating parameters (such as load, power, accumulated watt hours, fuel cell $H_2$ consumption rate, and the location of the segment being heated in the PEMFC cartridge) and stored temperatures correlated with these operating parameters. The data for input into a database for virtual temperature estimation may also be obtained by combining the above mentioned data with a mathematical model of the cartridge. An example of a mathematical model that may be utilized is found in "Assessment of Alane as a Hydrogen Storage Media for Portable Fuel Cell Power Sources" (Grew et al., Journal of Power Sources, Vol. 217, November 2012, pp. 417-430). FIG. 3 shows the consequences of allowing a segment to remain at a lower temperature than 155° C.; it can been seen that the resulting $H_2$ desorption (~4%) is significantly lower than desorption at temperatures higher than 155° C. (>7%). As shown in FIG. 3, even when the temperature is subsequently increased, maximum $H_2$ desorption is not fully achieved (i.e., 10% weight loss).

In another aspect of the present disclosure, one or a plurality of waste heat exchange layers are configured adjacent or proximate to an unused fuel source layer. If the temperature sensor senses that the temperature of the unused fuel source layer ranges from 90° C. to 155° C., then the control unit 600 increases the flow rate of the coolant fluid in the waste heat exchange layer to cool the unused fuel source layer. Thus, the temperature of the unused fuel source layer is kept below 90° C., which facilitates optimal $H_2$ production from the unused fuel source layer.

In another aspect of the present disclosure, depending upon the temperature detected by the temperature sensor, control unit 600 controls the heat applied by the waste heat exchange layer and/or the heater layer. For example, in this embodiment, control unit 600 may control the heat output by the heater layer(s), adjust the flow rate of the coolant fluid in the heat pipes of the waste heat exchange layers, or control the fuel cell operation point or operation load. In one exemplary embodiment of the present disclosure, control unit 600 controls the heater layer(s), waste heat exchange layer(s), and the PEMFC operating load to ensure that the heating rate ranges 0.5° C. to 1000° C. per minute per segment, 1° C. to 100° C. per minute per segment, or 5° C. to 10° C. per minute per segment. Alternatively, control unit 600 will control the heater layer, waste heat exchange layer, and PEMFC operating load to ensure that the temperature of the unused adjacent cartridge segment ranges from 25° C. to 125° C., from 25° C. to 100° C., or from 25° C. to 90° C.

Conventional proportional controller and conventional proportional integral and derivative (PID) controllers may be utilized in the implementation of the control unit and control method shown in FIGS. 6 and 7. In addition, the optimal control parameters (e.g., heating temperature and required $H_2$ flow rate) of the present control unit and control method may be varied, depending upon the size and geometry of the PEMFC cartridge. The control unit may be implemented as a microchip, embedded software in an integrated circuit board, or CPU in the PEMFC.

The present disclosure provides various advantages over conventional PEMFC cartridges. For example, the present PEMFC cartridge maximizes $H_2$ release because an entire individual cartridge segments may be effectively heated to heating temperatures ranging from 155° C. In contrast, conventional PEMFC cartridges (e.g., shown in FIG. 1), which heat the entire cartridge, fail to effectively heat the entire cartridge at heating temperatures ranging from 155° C.; some portions of the cartridge are heated at lower temperatures (ranging from 90° C. to 155° C.). As shown in FIG. 3, if the alane fuel source is heated at lower temperatures (ranging from 90° C. to 155° C.), then all of the $H_2$ will not be released from the alane fuel source, permanently reducing the energy density of the alane fuel source.

In addition, the present PEMFC cartridge minimizes loss of $H_2$ production, due to temperature decrease during shutdown. In the present PEMFC cartridge, individual cartridge segments are heated at lower temperatures during shutdown, rather than the entire cartridge (as in the conventional art). Thus, the energy density of a smaller portion of the alane fuel source is negatively impacted during shutdown, in comparison to a conventional PEMFC cartridge.

Moreover, the present PEMFC cartridge allows for quicker start-up and shutdown (i.e., heating and cooling) than the conventional art. Conventional PEMFC cartridges heat the entire alane fuel source (as shown in FIG. 1), whereas the present PEMFC cartridge only heats an individual cartridge segment. Thus, the thermal mass of the alane fuel source that is heated in the present PEMFC is significantly less than the alane fuel source heated in the conventional PEMFC. Accordingly, the individual cartridge segments of the present PEMFC are heated and cooled more quickly than the entire alane fuel source in a conventional PEMFC (e.g., alane fuel pellet 101 in FIG. 1).

Furthermore, the present PEMFC facilitates safer handling and swapping of cartridges, compared to the conventional art. Because the present PEMFC cartridge only heats smaller, individual cartridge segments (rather than entire cartridge), handling and swapping the present PEMFC cartridge, while hot, is safer for users (compared to conventional PEMFC cartridges where the entire cartridge is heated).

Due to the high energy density of the present PEMFC (and the aforementioned advantages of the present disclosure), the present PEMFC is lightweight and, accordingly, may be used in wearable or portable fuel cell systems. Furthermore, the high energy density of the present PEMFC may be used for military and commercial wearable or portable fuel cell systems. In addition, the present PEMFC may be used in devices requiring a $H_2$ source, including analytical equipment (such as gas chromatographs).

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

The following includes definitions of selected terms employed herein. The definitions include various examples. The examples are not intended to be limiting.

"One embodiment", "an embodiment", "one example", "an example", and so on, indicate that the embodiment(s) or example(s) can include a particular feature, structure, characteristic, property, or element, but that not every embodiment or example necessarily includes that particular feature, structure, characteristic, property or element. Furthermore, repeated use of the phrase "in one embodiment" or "in an embodiment" may or may not refer to the same embodiment.

"Computer-readable medium", as used herein, refers to a medium that stores signals, instructions and/or data. Examples of a computer-readable medium include, but are not limited to, non-volatile media and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, other optical medium, a Random Access Memory (RAM), a Read-Only Memory (ROM), a memory chip or card, a memory stick, and other media from which a computer, a processing device, a processor, or other electronic device can read. In one embodiment, the computer-readable medium is a non-transitory computer-readable storage medium.

"Component", as used herein, includes but is not limited to hardware, firmware, software stored on a computer-readable medium or in execution on a machine, and/or combinations of each to perform a function(s) or an action(s), and/or to cause a function or action from another component, method, and/or system. Component may include a software controlled microprocessor, a discrete component, an analog circuit, a digital circuit, a programmed logic device, a memory device containing instructions, and so on. Where multiple components are described, it may be possible to incorporate the multiple components into one physical component or conversely, where a single component is described, it may be possible to distribute that single logical component between multiple components.

"Software", as used herein, includes but is not limited to, one or more executable instructions stored on a computer-readable medium that cause a computer, processor, or other electronic device to perform functions, actions and/or behave in a desired manner. The instructions may be embodied in various forms including routines, algorithms, modules, methods, threads, and/or programs including separate applications or code from dynamically linked libraries.

What is claimed is:

1. A hydrogen fuel cell cartridge comprising a plurality of cartridge segments, each of the plurality of cartridge segments comprising:
    at least one insulation layer;
    at least one heater layer;
    at least one fuel source layer comprising a hydrogen fuel source compound; and
    at least one waste heat exchange layer,
    wherein the at least one fuel source layer is adjacent to the heater layer and the waste heat exchange layer, and
    wherein the at least one waste heat exchange layer contains a coolant fluid.

2. The hydrogen fuel cell cartridge according to claim 1, wherein the at least one insulation layer comprises an insulation material having a thermal conductivity of no greater than 0.04 W/m/K.

3. The hydrogen fuel cell cartridge according to claim 1, wherein the at least one insulation layer comprises an insulation material selected from the group consisting of aerogels, pyrogels, perlite, and mineral wool.

4. The hydrogen fuel cell cartridge according to claim 1, wherein the at least one heater layer comprises a resistive film heater selected from the group consisting of polyimide heaters, silicone rubber heaters, mica heaters, metal heaters, ceramic heaters, semiconductor heaters, and carbon heaters.

5. The hydrogen fuel cell cartridge according to claim 1, wherein the hydrogen fuel source compound is a compound selected from a group consisting of alane, ammonia borane, and ethylene diaminoborane, lithium hydride, and lithium aluminum hydride.

6. The hydrogen fuel cell cartridge according to claim 1, further comprising a temperature sensor.

7. The hydrogen fuel cell cartridge according to claim 1, wherein the coolant fluid has a vaporization point ranging from 180° C.

8. A non-transitory computer-readable storage medium configured to store a program for controlling a hydrogen fuel cell cartridge of a fuel cell, the program comprising instructions for:
    selecting a cartridge segment of the hydrogen fuel cell cartridge with the hydrogen fuel source that has not been depleted,
    determining a required hydrogen demand of the hydrogen fuel cell cartridge,
    controlling a heater layer of the selected cartridge segment,
    measuring hydrogen production of the selected cartridge segment, and
    determining whether the required hydrogen demand has been met.

9. The non-transitory computer-readable storage medium according to claim 8, the program further comprising instructions for controlling waste heat produced by the fuel cell by controlling wattage of the fuel cell, depending on a load required by the fuel cell.

10. The non-transitory computer-readable storage medium according to claim 8, the program further comprising instructions for controlling a flow rate of a coolant fluid in a waste heat exchange layer of the selected cartridge segment.

11. The non-transitory computer-readable storage medium according to claim 8, the program further comprising instructions for controlling a flow rate of a coolant fluid in a waste heat exchange layer of the selected cartridge segment, depending upon a power demand of the fuel cell.

12. The non-transitory computer-readable storage medium according to claim 8, the program further comprising instructions for controlling a flow rate of a waste heat exchange layer of an unused cartridge segment, based on a temperature of the unused cartridge segment determined by a temperature sensor.

13. The non-transitory computer-readable storage medium according to claim 8, the program further comprising instructions for controlling the heat applied to the selected cartridge segment by the heater layer, based on a temperature of an unused cartridge segment determined by a temperature sensor.

14. A hydrogen fuel cell system comprising:
a plurality of cartridge segments, each of the plurality of cartridge segments comprising:
at least one insulation layer, at least one heater layer, at least one waste heat exchange layer, and at least one fuel source layer; and
a control unit configured to:
select a cartridge segment of the hydrogen fuel cell cartridge with the hydrogen fuel source that has not been depleted,
determine a required hydrogen demand of the hydrogen fuel cell cartridge,
control a heater layer of the selected cartridge segment, measure hydrogen production of the selected cartridge segment, and
determine whether the required hydrogen demand has been met.

15. The hydrogen fuel cell system according to claim 14, wherein the at least one fuel source layer comprises a hydrogen fuel source compound selected from a group consisting of alane, ammonia borane, and ethylene diaminoborane, lithium hydride, and lithium aluminum hydride.

16. The hydrogen fuel cell system according to claim 14, wherein the control unit is further configured to control waste heat produced by the fuel cell by controlling wattage of the fuel cell, depending on a load required by the fuel cell.

17. The hydrogen fuel cell system according to claim 14, wherein the control unit is further configured to control a flow rate of a coolant fluid in a waste heat exchange layer of the selected cartridge segment.

18. The hydrogen fuel cell system according to claim 14, wherein the control unit is further configured to control a flow rate of a coolant fluid in a waste heat exchange layer of the selected cartridge segment, depending upon a power demand of the fuel cell.

19. The hydrogen fuel cell system according to claim 14, wherein the control unit is further configured to control a flow rate of a waste heat exchange layer of an unused cartridge segment, based on a temperature of the unused cartridge segment determined by a temperature sensor.

20. The hydrogen fuel cell system according to claim 14, wherein the control unit is further configured to control the heat applied to the selected cartridge segment by the heater layer, based on a temperature of an unused cartridge segment determined by a temperature sensor.

* * * * *